United States Patent
Sund

Patent Number: 5,439,158
Date of Patent: Aug. 8, 1995

[54] ATMOSPHERE CONTROLLED SOLDERING APPARATUS WITH INCORPORATED SOLDER PUMP

[76] Inventor: William Sund, 8 Amos Crescent, Downsview, Ontario, Canada, M3H 3X9

[21] Appl. No.: 199,953

[22] Filed: Feb. 22, 1994

[51] Int. Cl.⁶ .............................................. B23K 1/00
[52] U.S. Cl. .................................................... 228/37
[58] Field of Search ....................... 228/37, 260, 180.1

[56] References Cited

U.S. PATENT DOCUMENTS

| | | | |
|---|---|---|---|
| 4,616,775 | 10/1986 | Simonetti | 228/37 |
| 5,148,961 | 9/1992 | Humbert et al. | 228/37 |
| 5,203,489 | 4/1993 | Gileta et al. | 228/219 |
| 5,232,562 | 8/1993 | Elliott | 228/37 |
| 5,294,036 | 3/1994 | Den Dopper | 228/37 |
| 5,320,274 | 6/1994 | Precious et al. | 228/37 |

FOREIGN PATENT DOCUMENTS 2069905  9/1981  United Kingdom ............. 228/180.1

*Primary Examiner*—Mark Rosenbaum
*Assistant Examiner*—Jeanne M. Elpel
*Attorney, Agent, or Firm*—McConnell and Fox

[57] ABSTRACT

An improved wave soldering apparatus that protects the molten solder and the components being soldered from exposure to ambient air while the solder is in a liquid condition. At the soldering station, which is enclosed in a controlled atmosphere chamber, all the liquid solder, pumps and other elements exposed to liquid solder are enclosed within the chamber. This eliminates the formation of dross which interferes with the soldering process and also with the operation of the solder pumps. The inlet and outlet paths from the chamber, through which the components pass, are extended both to exclude ambient air and to permit the components to cool in a controlled atmosphere.

8 Claims, 3 Drawing Sheets

ATMOSPHERE CONTROLLED SOLDERING APPARATUS WITH INCORPORATED SOLDER PUMP

FIELD OF THE INVENTION

This application relates to soldering apparatus and particularly to wave soldering apparatus.

BACKGROUND OF THE INVENTION

Soldering apparatus for soldering circuit boards has been proposed in the past which minimizes oxidation of the solder and dross production by controlling the atmosphere in the area of the soldering operation. Typical of such apparatus is that shown in U.S. Pat. No. 4,921,156 to E. Hohnerlein which provides a long entrance and exit tunnel to the soldering chamber. Molten solder is provided to the soldering chamber through a supply channel from a tub of molten solder. The soldering chamber is sealed off from the ambient atmosphere by a skirt which dips down into the tub of solder.

While this arrangement controls the atmosphere in the location of the soldering process, the molten solder in the tub and the pumps which are required for the process, are both exposed to normal atmosphere. As a result, oxidation of the solder occurs and dross is formed which interferes both with the soldering process and the operation of the pumps and the pump bearings.

OBJECTS OF THE INVENTION

It is an object of this invention to provide soldering apparatus which not only controls the atmosphere in the location of the soldering process but also controls the atmosphere in all the locations where molten solder surfaces are exposed to atmosphere including not only the solder pot but also the pumps.

SUMMARY OF THE INVENTION

This object is attained by enclosing the whole solder pot including the pumps within the controlled atmosphere location. By driving the pumps from below, through the bottom of the solder pot, the drive motors can be located outside the atmosphere controlled chamber while the pumps and all molten solder surfaces are within the chamber.

A clearer understanding of my invention may be had from a consideration of the following description and drawings in which:

DESCRIPTION OF THE PREFERRED EMBODIMENT

Figure 1:
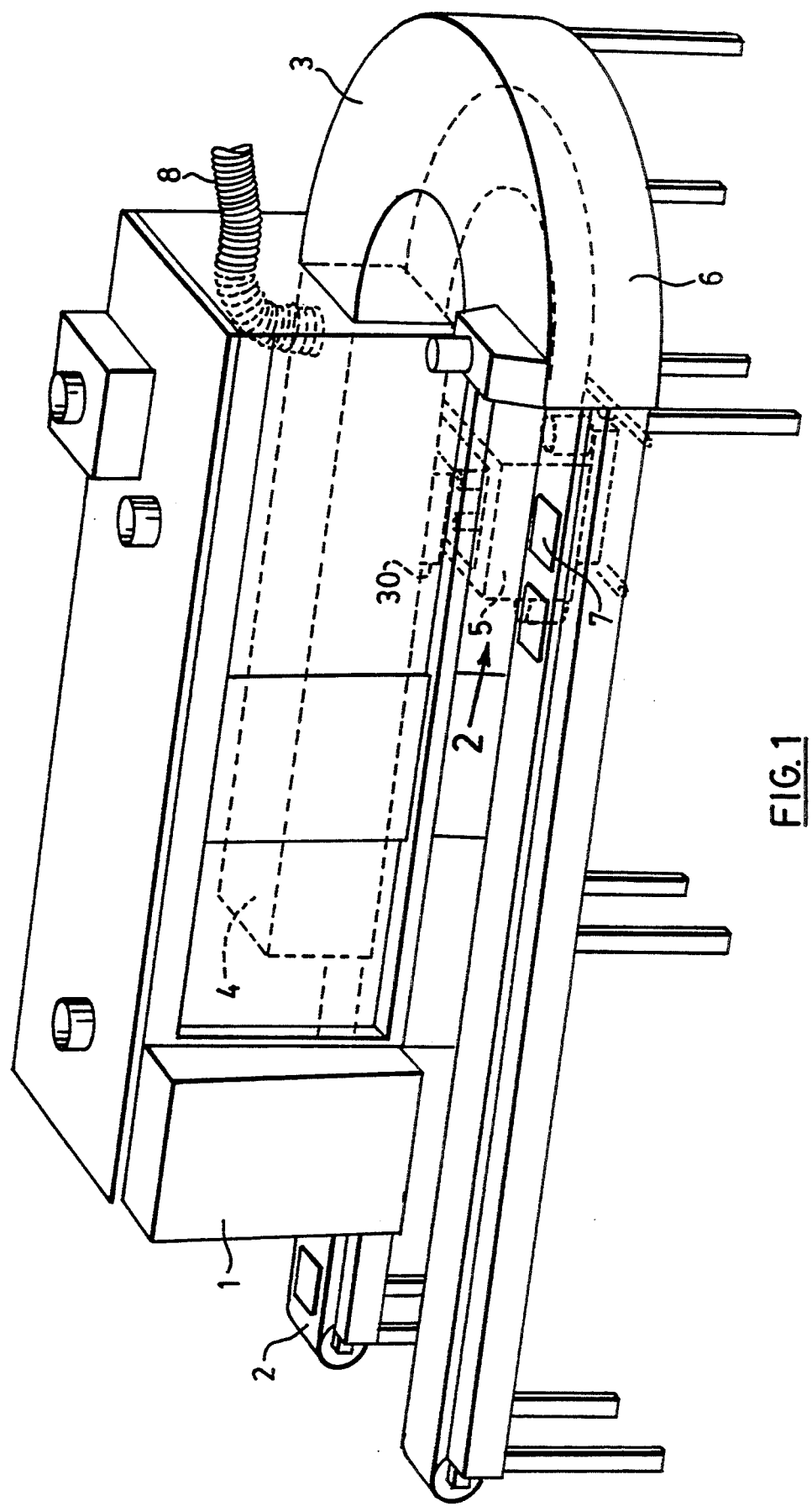
FIG. 1 is an isometric view of a complete apparatus incorporating my invention.

Considering first FIG. 1, it will be seen that a loading station 1 on conveyer line 2 places components such as circuit boards on the line for processing in the apparatus. The boards are carried, in a well known manner into the controlled atmosphere chamber 3. After traveling a substantial distance though the inlet chamber 4 the component reaches the soldering station 5. Here the soldering process is carried out in a manner to be later described in association with FIGS. 2 and 3. The component is now carried through the outlet chamber 6 to the unloading section 7 of the conveyer line.

As will be seen, both the inlet chamber 4 and the outlet chamber 6 are sufficiently long as to act as a barrier to introduction of ambient atmosphere into the soldering location which is provided with a suitable inert atmosphere through duct 8 at a pressure slightly above the ambient atmospheric pressure. As a result the soldering station, the pumps contained, and all molten solder surfaces, are only exposed to the inert atmosphere provided through duct 8 and are isolated from the external ambient air.

Figure 2:
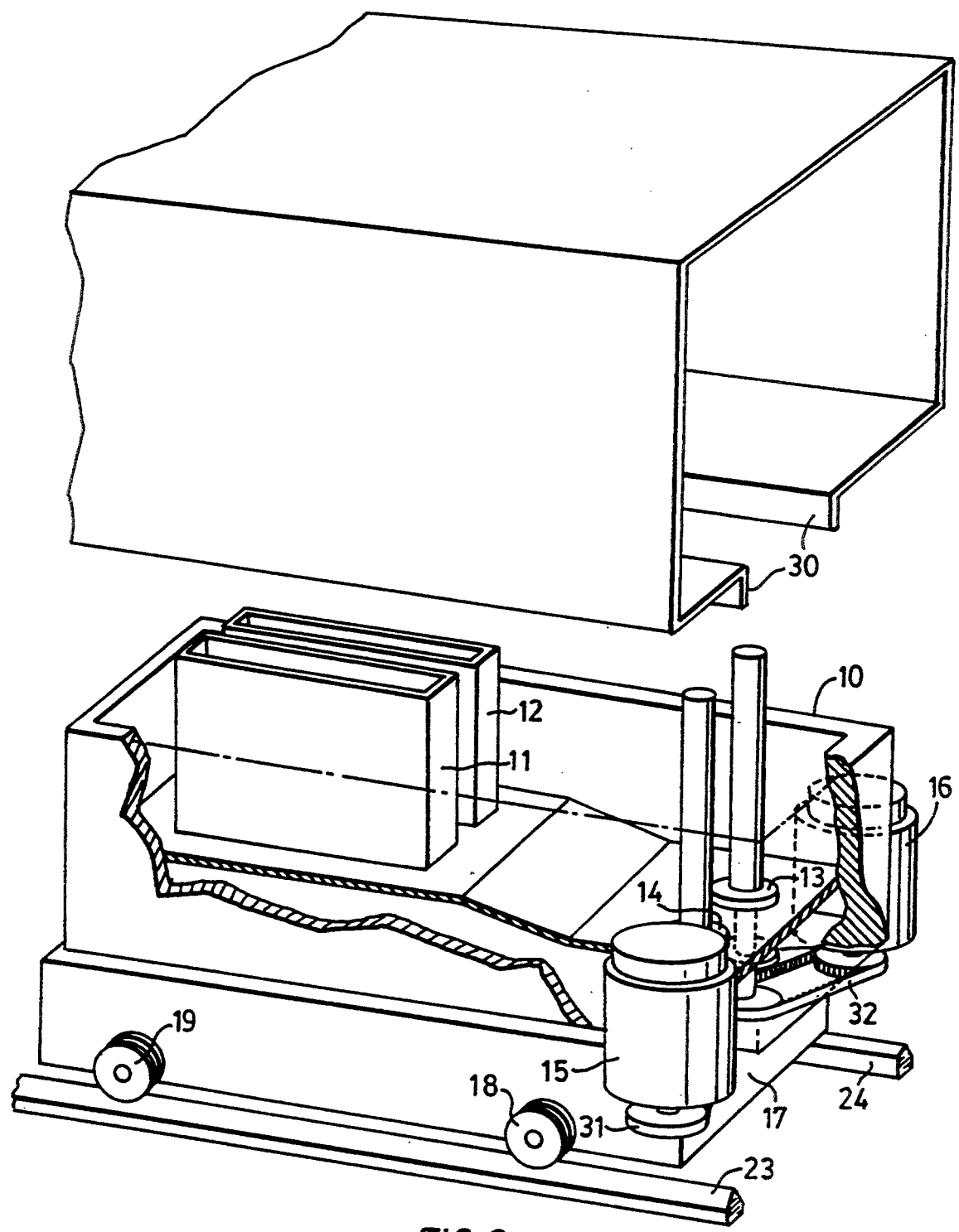
FIG. 2 is an isometric view of a soldering station in accordance with my invention for incorporation in the apparatus of FIG. 1 together with a portion of the chamber of FIG. 1.
Figure 3:
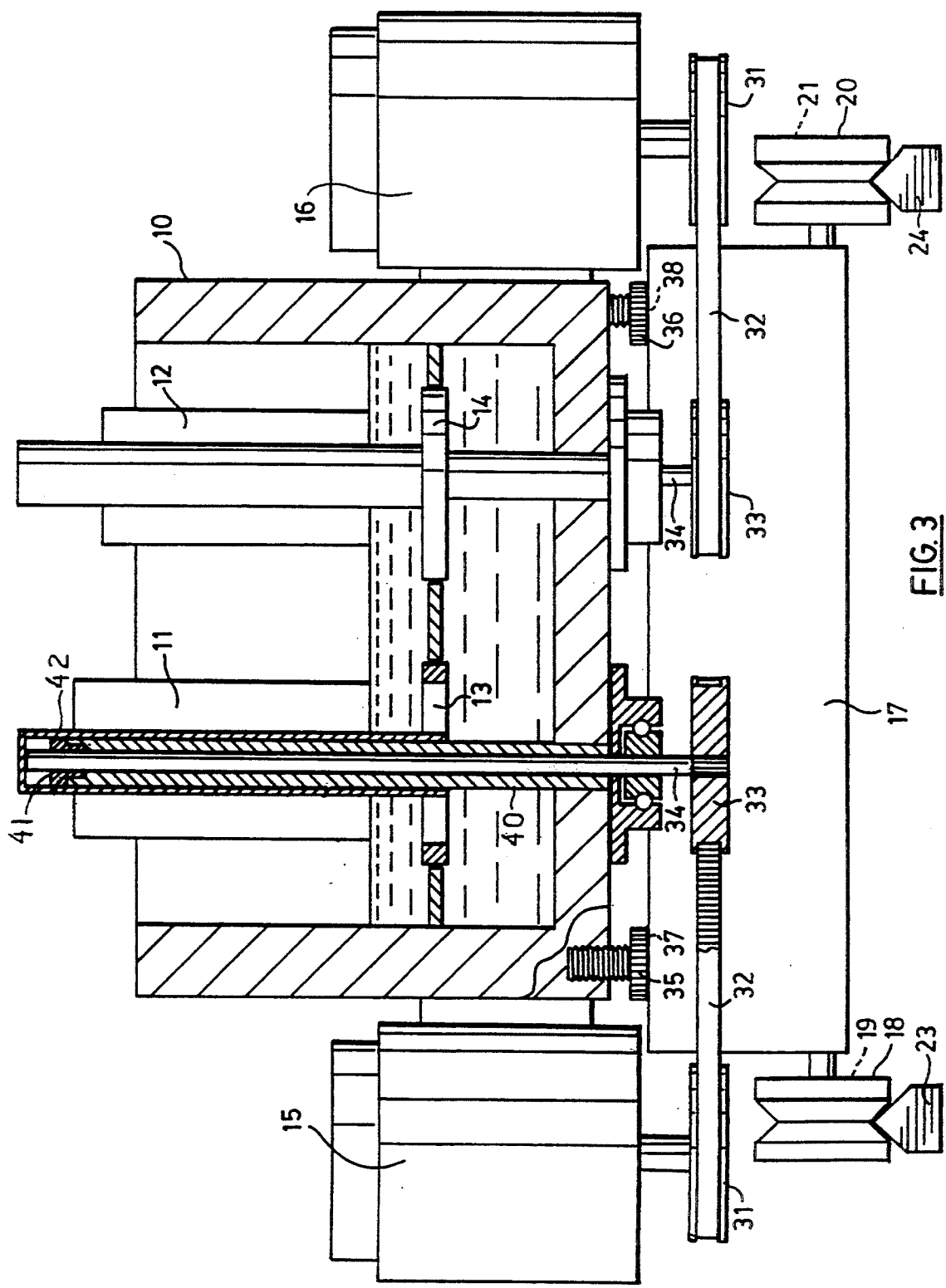
FIG. 3 is an elevational view of the soldering station of FIG. 2.

As shown in FIGS. 2 and 3 the soldering station comprises a solder pot 10, a pair of nozzles 11 and 12, a pair of pumps 13 and 14 and their associated drive motors 15 and 16. The whole assembly is mounted by means of adjusting screws such as screws 35 and 36 also screws 37 and 38 (not visible) on a trolley 17 having wheels 18–21 which run on tracks 23 and 24 for convenience of moving the station for servicing and alignment.

Projecting downwards from the controlled atmosphere chamber 3 at the location of the soldering station 5 is rectangular lip 30, as shown in FIG. 2. This lip fits into and seals to the solder pot 10 thus ensuring that the whole solder pot is exposed only to the controlled atmosphere.

Since the pumps 13 and 14 are enclosed in the solder pot 10 it is necessary to provide a drive for the pumps through the bottom of the pot. This is accomplished by the stand pipe arrangement illustrated in FIG. 3. A stand pipe 40 is sealed to the bottom of pot 10 and the shaft 34 extends up through the stand pipe 40 through a top bearing 41. The shaft 34 is fixed to the top end of a sleeve 42 which extends back down over pipe 40 and drives pump 13. As will be seen in FIGS. 2 and 3 the motors, such as motor 15, have a sprocket 31 mounted on their shaft which, through a belt 32 drives a sprocket 33 on the shaft 34. In this manner the shafts 34 drive their respective pumps 13 and 14.

OPERATION

The soldering station 5, suitably loaded with solder, is moved under the chamber 3 and raised so that lip 30 seals onto pot 10. A flow of inert gas, such as nitrogen, argon, $CO_2$ or mixtures of other inert gasses is introduced through duct 8 and continued until the system is purged and the atmosphere at the soldering station has reached a satisfactory status.

The temperature of the solder pot 10 may now be raised by thermostatically controlled electrical heaters (not shown but well known in the art) until the solder reaches the desired temperature. Motors 15 and 16 may now be energized driving the pumps 13 and 14 which increases the pressure in the solder in the lower portion of pot 10 causing a flow of solder up through the laminar wave nozzle 11 and also through the turbulent wave nozzle 12.

The components on the conveyer line may now be presented to the soldering station and processed in the usual manner by the flow of solder from the nozzles 11 and 12. As the components proceed forward through the chamber 3 they are carried through the outlet chamber 6 before reaching the outside air. This ensures that the atmosphere at the soldering station is not contaminated by air flowing in from the end of chamber 6 and also that the components being soldered are not exposed to air while the solder is still in a liquid state. The extension also permits cooling of the board under controlled atmosphere conditions and eliminates the need for cooling fans at the exit.

The extension of chamber 3 at both the inlet end 4 and at the outlet end 6 protects the soldering station 5 from the intrusion of ambient air and permits an ambient at the soldering station of as little as ten parts per million of outside air.

While the soldering station has been described with specific nozzles, pumps and locating means it will be understood that many variations may be made in the specific structure within the ambit of this invention. For example a single nozzle might be sufficient in some applications, the means of driving the pumps from motors outside of the pot may be changed or the physical form of the complete apparatus may appear quite different all within the scope of this invention.

I claim:

1. A wave soldering apparatus comprising a controlled atmosphere chamber, a soldering station including a solder pot having a bottom wall and side walls containing liquid solder sealed to said chamber, at least one solder nozzle in said station supplied with a flow of liquid solder by a solder pump, drive means for said pump comprising a rotatable shaft passing through a stand pipe sealed to said bottom wall, said stand pipe extending above the level of said liquid solder in said pot, means to move components to be soldered into said chamber and over said at least one solder nozzle and in contact with said liquid solder, characterized in that said at least one solder nozzle, said pump and all liquid solder surfaces are enclosed within said chamber.

2. An apparatus as claimed in claim 1 wherein said chamber is provided with a flow of inert gas above ambient air pressure at the location of said soldering station and is provided with an extended inlet chamber through which components are introduced into said chamber.

3. An apparatus as claimed in claim 2 wherein said chamber is provided with an extended outlet chamber through which components move out of said chamber.

4. An apparatus as claimed in claim 1 wherein said rotatable shaft is driven by a drive motor external to said chamber.

5. An apparatus as claimed in claim 1 wherein said soldering station is removably sealed to said chamber.

6. A wave soldering apparatus comprising a controlled atmosphere chamber having top, side, end and bottom walls, an elongated inlet tunnel joined to one end wall of said chamber, a soldering station sealed to an opening in the bottom wall of said chamber, an elongated outlet tunnel joined to the other end wall of said chamber, means to transport components to be soldered in through said inlet tunnel through said chamber, over said soldering station and out through said outlet tunnel, wherein said soldering station includes a solder pot having a bottom wall and solder therein, means to heat said solder in said pot to a controlled liquid temperature, at least one solder pump within said pot driven by a drive shaft extending through a stand pipe fixed to said bottom wall, at least one solder nozzle within said pot, means, external to said pot, to drive said drive shaft and said at least one pump and cause said solder to flow up, out of said at least one solder nozzle, means to supply a flow of inert gas to said chamber sufficient to inhibit flow of ambient air in through said tunnels and into said chamber characterized in that the only gas the said solder is said pot, the at least one solder nozzle, and the at least one pump is exposed to is the inert gas atmosphere within said chamber.

7. A wave soldering apparatus as claimed in claim 6 wherein said solder pot is sealed to said opening by a downwardly directed lip which projects from said opening in said chamber and fits slidably into said pot.

8. A wave soldering apparatus as claimed in claim 7 wherein said soldering station may be removed from said chamber by lowering said pot to disengage said lip and moving it away from said chamber.

* * * * *